Fig. 1.

Trevor O. Davidson.
Bruno L. Lonngren.
INVENTORS.

BY Hoar + Ruhloff
ATTORNEYS

March 6, 1951 T. O. DAVIDSON ET AL 2,543,765
WINCH FOR CONVERTIBLE DRAGLINES AND SHOVELS
Filed Feb. 5, 1947 6 Sheets-Sheet 2

Trevor O. Davidson.
Bruno L. Lonngren.
INVENTORS.

BY Hoar & Ruhloff
ATTORNEYS.

March 6, 1951  T. O. DAVIDSON ET AL  2,543,765
WINCH FOR CONVERTIBLE DRAGLINES AND SHOVELS
Filed Feb. 5, 1947  6 Sheets-Sheet 4

Trevor O. Davidson
Bruno L. Lonngren
INVENTORS,
BY Roger Sherman Hoar
ATTORNEY.

March 6, 1951 T. O. DAVIDSON ET AL 2,543,765
WINCH FOR CONVERTIBLE DRAGLINES AND SHOVELS
Filed Feb. 5, 1947 6 Sheets-Sheet 5

Fig. 8.

Trevor O. Davidson.
Bruno L. Lonngren.
INVENTORS,
BY Roger Sherman Hoar
ATTORNEY.

Patented Mar. 6, 1951

2,543,765

UNITED STATES PATENT OFFICE 2,543,765

WINCH FOR CONVERTIBLE DRAGLINES AND SHOVELS

Trevor O. Davidson, Milwaukee, and Bruno L. Lonngren, South Milwaukee, Wis., assignors to Bucyrus-Erie Company, South Milwaukee, Wis., a corporation of Delaware Application February 5, 1947, Serial No. 726,570

19 Claims. (Cl. 254—185)

Our invention relates to new and useful improvements in the control of thrusting and hoisting functions of power shovels, and the control of dragging and hoisting functions of draglines more particularly power shovels and draglines of the friction type, so called because operated by a constantly running motor (usually either gasoline, Diesel, or electric) which performs the various operative functions through friction clutches. This present application is a continuation-in-part, i. e., a continuation as to all common subject matter, of our copending patent application, filed December 30, 1944, Serial No. 570,610, which was abandoned, without prejudice to this present application, on September 13, 1948.

Ever since the world's first steam shovel, described in U. S. Patent No. 1089, issued to William S. Otis, digging by the conventional power shovel has involved two movements, namely: motion in a circle about a point (known as the shipper shaft) approximately halfway up the boom, which motion is known as hoisting and lowering; and motion in a circle about the outer end of the boom, which motion is known as thrusting, or crowding, in and out. Strictly speaking, the curve of each motion is an involute, but the circle which serves as the evolute of each involute (in the one case the shipper-shaft pinion, and in the other case the boom-point sheave) is so small that for purpose of the present discussion we can treat the involute as approximately a circular arc.

Rope-thrusting, so-called, was first shown and described in U. S. Patent No. 1,430,298, issued September 26, 1922, to Walter Ferris and Svante R. W. M. Bager. This epoch-making principle involves dead-ending the hoist cable on a drum keyed to the shipper shaft, and engaging racks on the dipper handle with pinions keyed to the shipper shaft. Thereby thrusting out is effected solely by the weight of the dipper and contents (supplemented, when hoisting with the dipper hooked into a bank, by the downward reaction of the bank on the dipper) acting to impose tension in the hoist cable. Thrusting out is controlled, and thrusting in is effected, by a second cable extending from the main winch on the main works on the shovel to the shipper shaft drum. The advantages which inhere in a rope-thrust shovel will be discussed later herein.

In a variant known as rackless rope thrust, the hoist rope imparts its tension directly to the dipper handle, rather than through the shipper-shaft drum, pinions, and rack. This variant is shown, for example, in U. S. Patent No. 1,564,791, issued December 8, 1925, to Roger Sherman Hoar.

Rope thrusting eliminates the need of a boom engine to drive the shipper shaft, and thus not only thereby reduces the weight on the boom, but also reduces the weight of the boom itself by enabling it to be built lighter. But, of course, these same advantages could be attained by a sprocket chain drive up the boom from the main engine to the shipper shaft.

The rackless type of rope thrust still further reduces weight, because by its greater flexibility as contrasted with rigidity, it enables the boom to be built lighter still. But, of course, this same advantage could be attained by using a two-rope drive in place of the sprocket chain, racks, and pinions.

The desirability of reducing the front end weight as much as possible is due to saving in structural cost, reduction of need for counter-weighting, and reduction of swinging inertia.

From the foregoing, it will be seen that the advantages (thus far listed) of the two types of rope thrust are paralleled by two types of positive thrust. But other advantages, not thus paralleled, will be discussed later herein.

In all types of rope thrust, the dipper automatically falls during thrusting out, and rises during retracting, except insofar as these tendencies are offset by intentionally hauling in or paying out the hoist rope. The ratio of the hoist motion of the dipper, in proportion to its thrust motion, depends upon the number of hoist reaches in the hoist rope, and (in the rack variety) the ratio of shipper-shaft drum diameter to pinion diameter, or (in the rackless variety) the number of thrust reaches in the hoist rope.

When thrusting out with a rope-thrust shovel, the drop of the dipper can be partially offset, wholly offset, or more than offset, by clutching the hoist drum to the winch engine, and then easing out the thrust-control rope at various appropriate rates of speed.

When retracting, the natural rise of the dipper can be enhanced by clutching the hoist drum too.

Let us now consider the relative control and characteristics of a positive thrust and a rope thrust.

Taking into consideration the fact that we have a constant-speed one-direction motor, we have in a positive thrust shovel the following five digging motions to select from:

1. Pure hoisting, in a circular arc about the shipper shaft.

2. Pure thrusting out, in a circular arc about the point of the boom.

3. The resultant of pure hoisting and pure thrusting out.

4. Pure retracting, in a circular arc about the point of the boom.

5. The resultant of pure hoisting and pure retracting.

Note that, in a positive-thrust shovel, although the paths of the two resultants can to some extent be selected by proper rope ratios, and drum and gear ratios within the main winch, yet the selections are discrete (except insofar as clutch slipping is resorted to), and once selected are fixed unless and until the machine is reconstructed.

Furthermore, in a positive thrust shovel, the resultant of pure hoisting and pure thrusting out has a much greater speed than either of the components alone, due to the fact that full engine speed is contributing twice to the speed of the dipper, namely once through the hoist rope, and once through the crowd machinery. This phenomenon either reduces both controllability and digging force in heavy digging, or reduces speed in the spotting part of the cycle.

In a rope-thrusting shovel (inasmuch as brake slipping is more controllable than clutch slipping), there is the advantage that an infinite gradation of paths can be chosen during combined thrusting out and hoisting. But, more important, the engine is contributing to the combined motion through only the hoist rope, and therefore the speed of the combined motion is practically merely that of pure hoisting, which can accordingly be adjusted to exactly the optimum speed-force ratio.

Another advantage of a rope-thrusting shovel is that, when pulling in and raising the dipper to dump, the dipper rise which results from retracting is added to the hoist speed, thus greatly accelerating the spotting portion of the cycle.

As a by-product of all this, in a rope-thrusting shovel peak loads on the engine are eliminated, and a smaller less expensive engine can be used.

However, in spite of these marked advantages of rope-thrusting shovels over positive-thrust shovels, and of the rope variety of each over the sprocket-chain variety of each, there are certain partially offsetting disadvantages, as follows:

1. The dead-ending of the hoist rope on the dipper, with the resulting elimination of padlock sheave and the consequent higher lift, is not possible in a rope-thrusting shovel (except of one limited and not altogether practical type).

2. Setting a definite hoist-thrust ratio, not dependent on a slipping brake control, is sometimes desirable.

3. Pure independent retracting is sometimes desirable, as for example in horizontal spotting.

4. The rackless rope thrust, being limited to integral rope ratios, does not permit the selection of intermediate ratios which is possible with the rack-and-pinion rope thrust.

STATEMENT OF OBJECTS

Accordingly it is the principal object of our invention to devise a shovel which shall possess all the advantages of a positive thrust, a rackless rope thrust, and a rack-and-pinion rope thrust, with none of the disadvantages of any.

Another object of our invention is to devise a power shovel readily convertible into a dragline excavator.

In addition to our principal objects, above stated, we have worked out a number of novel and useful details, which will be readily evident as the description progresses.

Our invention consists in the novel parts and in the combination and arrangement thereof, which are defined in the appended claims, and of which three embodiments are exemplified in the accompanying drawings, which are hereinafter particularly described and explained.

DESCRIPTION OF FIGURES

Throughout the description, the same reference number is applied to the same member or to similar members.

GENERAL DESCRIPTION

*First shovel embodiment (Figures 1–3 and 5)*

Figure 1:
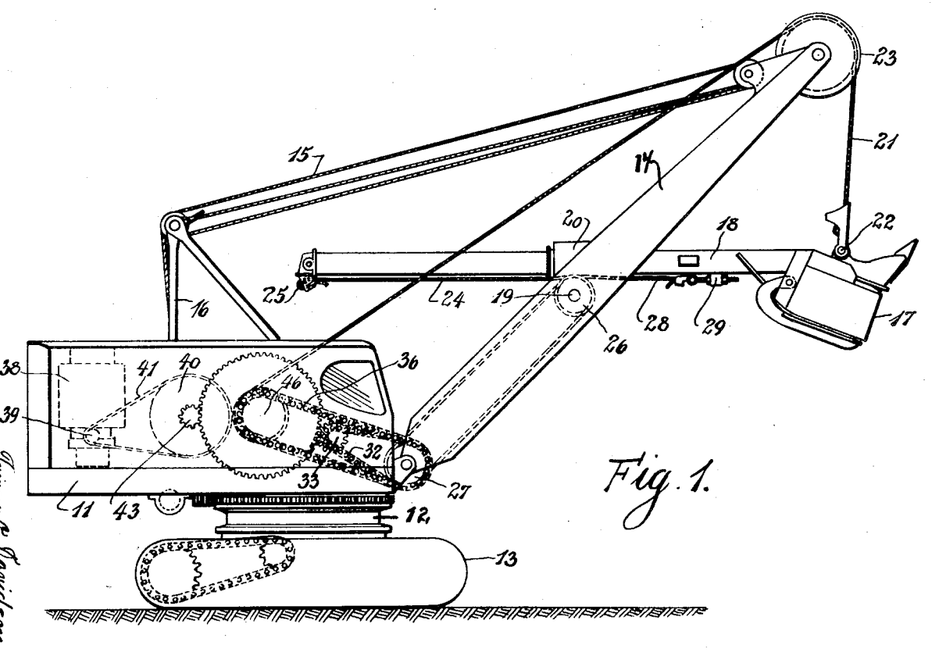
Figure 1 is a side elevation of our shovel, somewhat conventionalized.

Turning now to Figure 1, we see that 11 is the main frame of a power shovel, capable of 360° revolution about a pintle on a base 12, which in turn is supported by creeping traction 13.

An inclined boom 14 has its foot pivoted on the front end of main frame 11, and its outer end supported by boom-suspension cable 15, which extends from an A-frame 16 on the main frame.

A dipper 17 is secured to the end of a dipper-handle 18, which is capable of tilting about a shipper shaft 19 on the boom, and of reciprocating with respect to said shipper shaft, through a saddle-block 20, which is pivoted on the shipper shaft in any conventional manner.

Hoisting and lowering the dipper is effected by hoist-rope 21, which passes from an anchorage 22 on the dipper, over a sheave 23 at the point of the boom, to a hoist drum 46.

Thrusting out the dipper is effected by a rope 24, which is anchored to the rear end of the handle 18 at 25, and passes thence over one of sheaves 26 on the shipper-shaft, to a drum 27 at the foot of the boom.

Retracting the dipper is effected by a rope 28, which is anchored to the front end of the handle 18 at 29, and passes thence over another of sheaves 26 on the shipper shaft, to drum 27 at the foot of the boom.

As a matter of fact, we contemplate twinning each of ropes 21, 24 and 28, but it is not essential to an explanation of the mechanical principles of our invention to show any of them twinned herein.

Figure 2:
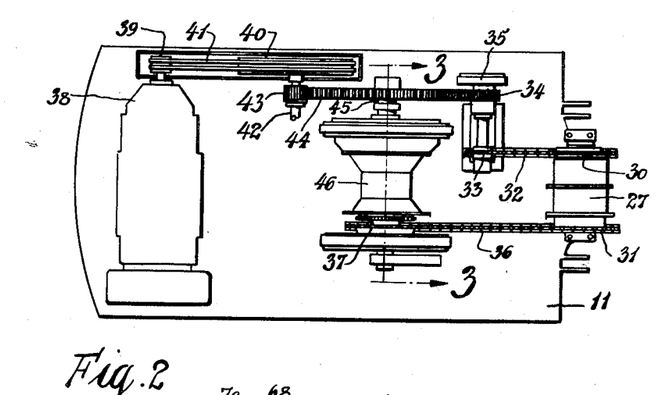
Figure 2 is a plan view of the main machinery of our shovel. Those parts of the machinery which are not involved in our invention have been omitted to simplify the showing.

Let us now consider Figure 2, in connection with Figure 1. On the shaft of drum 27, already referred to, there are two sprockets 30, 31. Sprocket-chain 32 connects sprocket 30 to sprocket 33, which is clutchable (for thrusting out) to pinion 34 by clutch 35, which may be of any convenient sort, controlled in any convenient manner. Sprocket-chain 36 connects sprocket 31 to sprocket 37, for retracting.

Sprocket 30 is not keyed to drum 27, but rather drives it through a planetary gear-reduction (not shown) which is concealed inside the drum, and which reduces the speed of the drum to below the speed imposed (as hereinafter explained) on the drum by sprocket 31 which is keyed thereto. This speed reduction could equally well be effected by changing the ratio between gear 44 and pinion 34, and/or by changing the ratio between sprocket 33 and sprocket 30, or by any other conventional form of gear-reduction. In our machine, as built, the speed imposed on drum 27 by sprocket 30 happens to be approximately 50% of the speed imposed by sprocket 31.

Constant speed engine 38 (which may be gasoline, Diesel, electric, or otherwise) drives pulley 39, which in turn drives pulley 40 through belts 41. Pulley 40 drives shaft 42, on which is keyed pinion 43. This shaft 42 also drives the power boom hoist (not shown) which actuates boom-hoist cable 15, and the swinging and propelling machinery (not shown).

Pinion 43 drives gear 44, keyed to shaft 45. Gear 44 in turn drives pinion 34 already mentioned.

Thus we have a constantly rotating pinion 34, clutchable so as to drive sprocket 33 as already seen; and a constantly rotating shaft 45, clutchable so as to drive sprocket 37, and/or so as to drive hoist drum 46, all of which are explained below.

Figure 3:
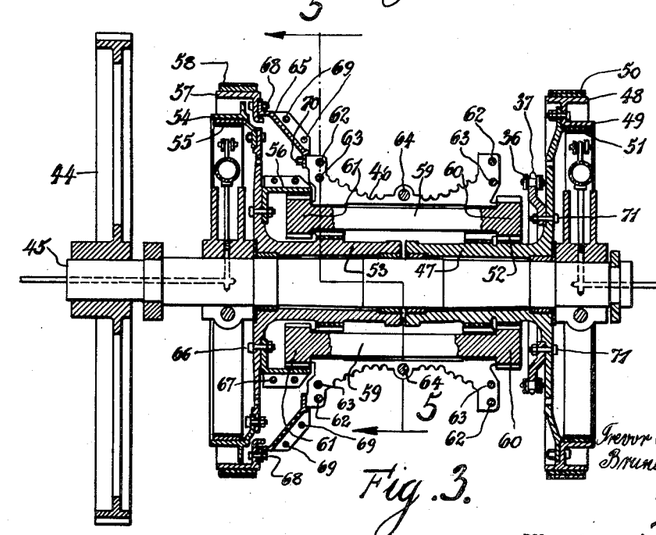
Figure 3 is an enlarged section of the drum and its associated mechanism showing the first embodiment of our invention, taken along the lines 3—3 of Figure 2.
Figure 4:
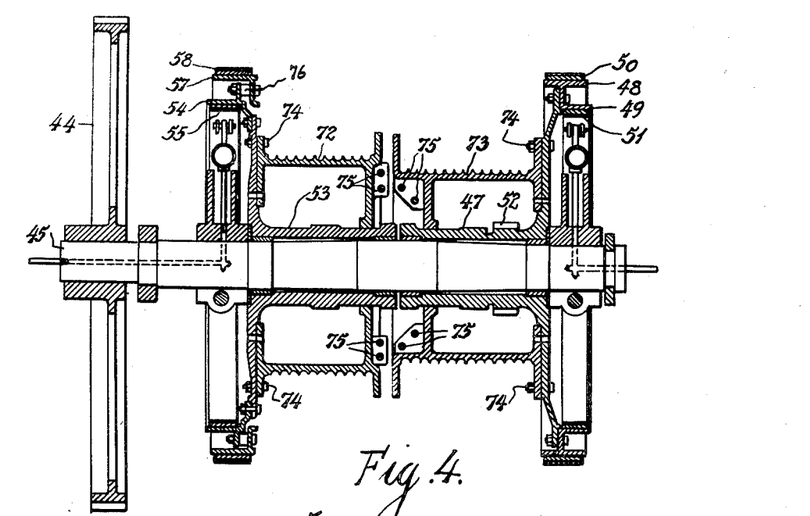
Figure 4 is the same section, showing the same embodiment converted into a dragline.
Figure 5:
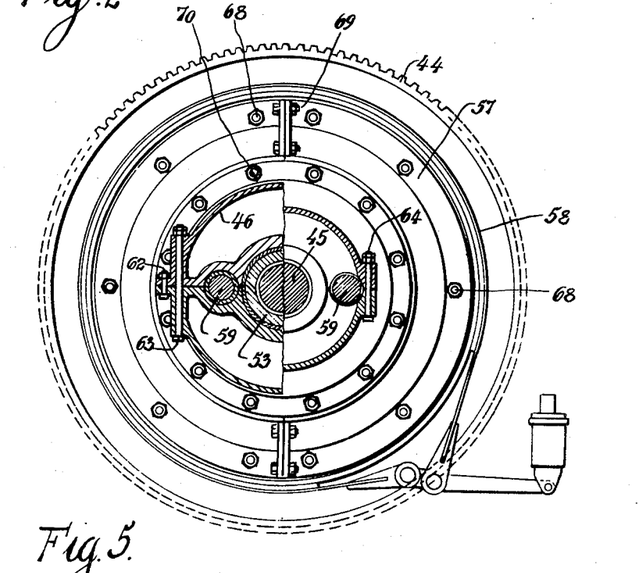
Figure 5 is a section, taken along the lines 5—5 of Figure 3.

We shall now consider the first embodiment of our invention, as shown in Figures 3 to 5 inclusive.

Turning first to Figure 3, we see that retracting sprocket 37 is rigidly attached to sleeve 47, which is free to rotate on shaft 45. Sleeve 47 carries external brake drum 48, and internal clutch drum 49. A contracting double-acting brake band 50 can be imposed upon brake drum 48 in any convenient manner. An expanding clutch band 51, carried by and rotating with shaft 45, can be imposed upon clutch drum 49, in any convenient manner. Any other sort of clutch and/or brake could be substituted, the particular form thereof not being a part of our invention. Also the method of application thereof is immaterial.

Sleeve 47 also carries sun pinion 52 of a planetary system.

Shaft 45 also carries sleeve 53, which is free to rotate thereon. This sleeve carries internal clutch drum 54, but no brake drum. An expanding clutch band 55, carried by and rotating with shaft 45, can be imposed upon clutch drum 54, in any convenient manner. Any other sort of clutch could be employed, the particular form thereof not being a part of our invention. Also the method of application thereof is immaterial.

Sleeve 53 also carries ring-gear 56 of the planetary system. Sun pinion 52 and ring-gear 56 are each generically referred to in certain of our claims as a "non-planet gear."

Hoist drum 46 is journaled for free rotation on the two sleeves 47, 53. It carries external brake drum 57, which is connected to it by spacer 65. Drum 46 and spacer 65 might be built integral, if desired. A contracting brake band 58 can be imposed upon brake drum 57, in any convenient manner. Any other sort of brake could be substituted, the particular form thereof not being a part of our invention. Also the method of application thereof is immaterial.

Journaled in drum 46, and extending lengthwise thereof, are two shafts 59, bearing on one end thereof planet pinions 60 engaging sun pinion 52, and on the other end thereof planet pinions 61 engaging ring gear 56. Three, or some other number of such shafts and pairs of pinions, could be employed; but we employ two; chiefly for the following reason. It will be noted from Figure 5 that drum 46 is longitudinally split, and that shafts 59 lie in the split. This enables these shafts to be readily removed from the drum when the drum is disassembled as hereinafter mentioned.

The length of shafts 59 is an important feature, inasmuch as the slight flexibility thereby introduced adjusts for any slight failure of the teeth of the planet pinions to register exactly with the sun pinion and the ring gear.

Although the planetary system discussed herein is highly advisable, the placing of the sun gear at one end of drum 46, and the ring gear at the other, and the consequent employment of paired planet gears, is not essential. For example, the entire planetary system could be located in one plane within the drum.

*First dragline embodiment (Figure 4)*

Turning now to Figure 4, we see that our shovel is readily adapted to conversion into a dragline, inasmuch as two clutches and two brakes are available on the main shaft, for the control of the two drums of a dragline.

To convert to a dragline, the shovel's hoist drum 46, together with planet gears 60 and 61, and their shafts, are removed in two sections (see Figure 5), by first taking out bolts 62, 63 and 64. Ring gear 56, which also is in two sections, is likewise removed, by taking out bolts 66 and 67 (Figure 3). Spacer 65, which also is in two sections, is likewise removed, by taking out bolts 68, 69 and 70. Sprocket 37, which also is in two sections, is likewise removed, by taking out bolts 71; the two parts of this sprocket need not have been connected together by flanges like the other two-part members just mentioned.

Brake drum 57, being no longer attached to winch drum 46, is bolted instead to clutch drum 54, through spacer 76.

Dragline drums 72 (preferably for hoist) and 73 (preferably for drag), which are each made up of two sections, are then respectively bolted together and to sleeves 53 and 47, by bolts 75 and 74.

The only part of the planetary system remaining is sun gear 52, now enclosed in drum 73.

The boom-foot drum 27 is supplanted by a conventional dragline fairlead. Pinion 34 and associated parts can be permitted to idle.

*Second shovel embodiment (Figures 6 and 9)*

Figure 6:
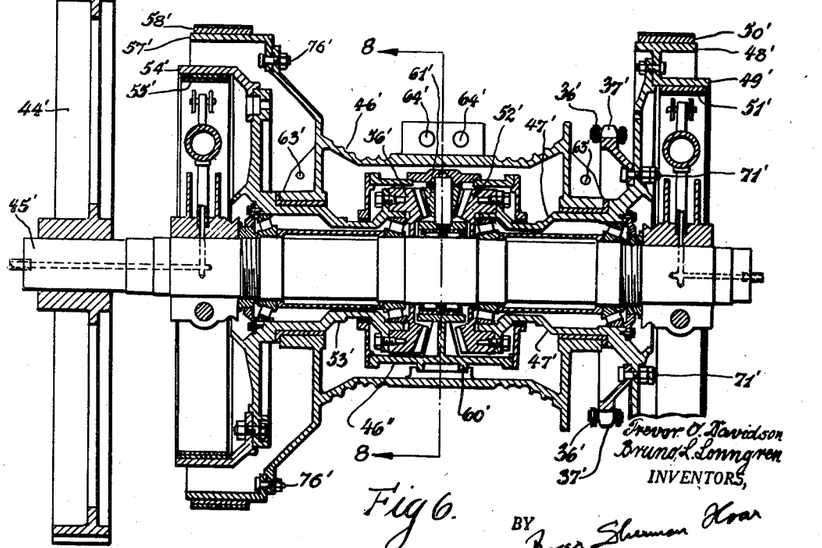
Figure 6 is an enlarged section of the drum and its associated mechanism showing the second embodiment of our invention, taken along the lines 6—6 of Figure 9.

Turning now to Figure 6, we see that it shows the hoist drum and its associated mechanism for the second embodiment of our invention in which differential instead of planetary gearing is used. Note, however that this differential gearing is operatively equivalent to a double-sun no-ring planetary gearing system although the former is more compact for our purpose.

Retracting sprocket 37' is rigidly attached to sleeve 47', which rotates free on shaft 45' and carries external brake drum 48' and internal clutch drum 49'. Bands 50' and 51' can be imposed on the brake and clutch respectively in the same manner as in our first embodiment, the particular method of application being immaterial.

Sleeve 47' also carries non-planet bevel gear 52' of the differential gearing system.

Shaft 45' also carries sleeve 53', which is free to rotate thereon. This sleeve carries internal clutch drum 54', but no brake drum. Its clutch band 55' is carried by and rotates with shaft 45', as in our first embodiment.

Sleeve 53' also carries non-planet bevel gear 56' of the differential system.

Hoist drum 46' is journaled for free rotation on sleeves 47' and 53' and carries external brake drum 57', upon which brake band 58' is imposed in any convenient manner. The particular form of brake or method of application is immaterial.

Journaled in differential spider 46'', which is carried by and free to rotate about shaft 45' and is keyed to drum 46' by means of driving lugs 60', are four planet pinions 61' which engage non-planet bevel gears 52' and 56'. Some other number of such planet pinions could, however, be employed.

Figure 9:
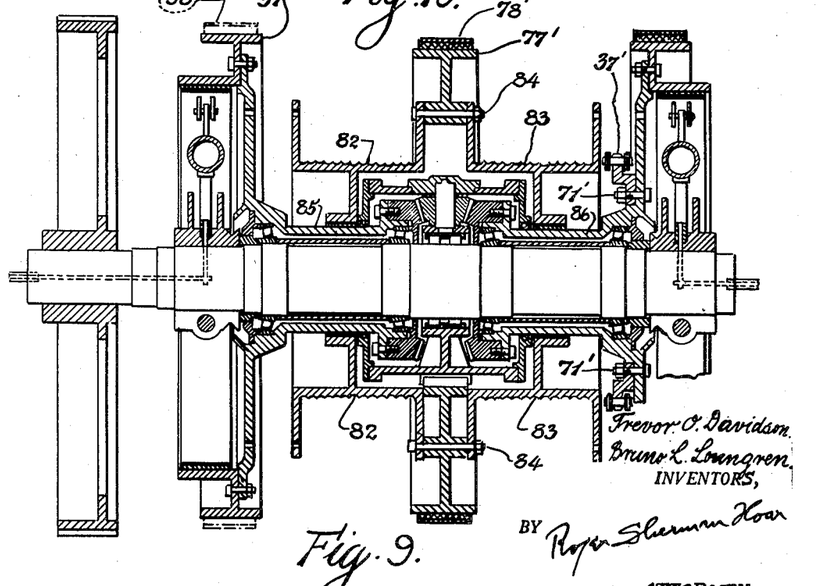
Figure 9 is an enlarged section of the drum and its associated mechanism, showing the third embodiment of our invention.

Turning now to Figure 9, it will be noted that drum 46' is split longitudinally. This permits ready removal of the drum when the mechanism is converted for dragline operation as hereinafter described.

Figure 7:
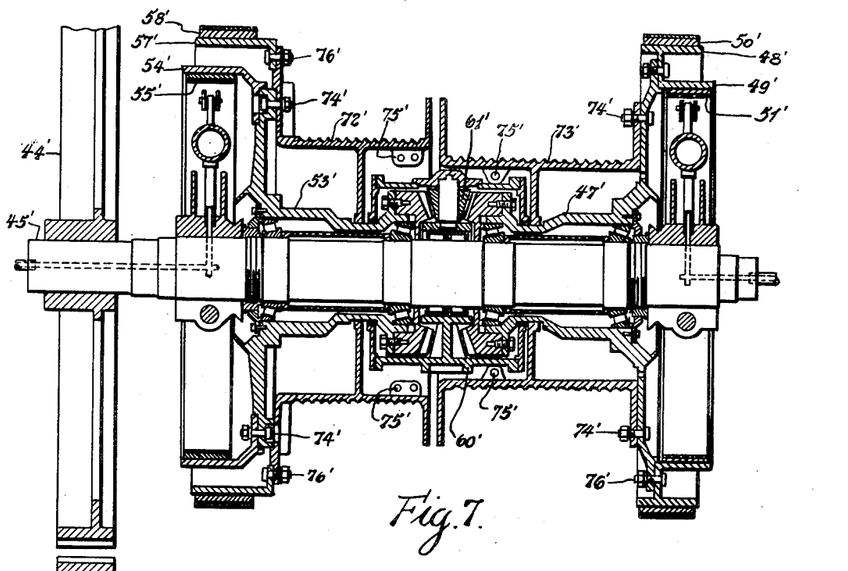
Figure 7 is the same section as Figure 6, showing our second embodiment converted into a conventional dragline.

Second dragline embodiment (Figure 7)

Turning now to Figure 7, we see that, to convert our second embodiment as above described into a dragline, the shovel's hoist drum 46' is removed in two sections (see Figure 8) by taking out bolts 63', 64' and 68'. Sprocket 37', which also is in two sections, is likewise removed by taking out bolts 71'. The differential spider and gearing, being sufficiently compact, remains intact, this being a simplification of the conversion required in our first embodiment.

Dragline drums 72' (preferably for hoist) and 73' (preferably for drag), which are each made up of two sections, are then respectively bolted together and to sleeves 53' and 47' by bolts 74'. Brake drum 57', being no longer attached to shovel drum 46', is bolted instead to dragline drum 72'.

The boom-foot drum 27 is supplanted by a dragline fairlead and other suitable changes are made just as in the case of our first embodiment. The differential system is left intact, the idling motion of spider 46'' being determined by the relative motions of the bevel gears 52' and 56'.

Third shovel embodiment (Figure 9)

Turning now to Figure 9, we see the third embodiment of our invention in which a differential gearing system is used as in our second embodiment, but the parts are so designed that conversion to a regenerative dragline and vice versa is greatly simplified.

The shovel mechanism in Figure 9 is similar to that shown in Figure 6, except that the hoist drum is now in two transversely split sections 82 and 83 which are attached by bolts 84 to the intermediate spider-mounted brake drum 77'. Brake band 78' imposed on drum 77' serves as the hoist brake, in place of brake band 58' and its drum 57' which now is bolted to sleeve 85 and preferably is not used when the mechanism operates as a shovel. Sleeves 85 and 86 are made uniform in diameter to permit merely sliding the drum sections 82 and 83 outwardly into position for connection to their respective sleeves, thereby eliminating the need for removal and replacement of the drum and installation of the regenerative brake drum and band when the shovel is converted into a dragline.

Figure 10:
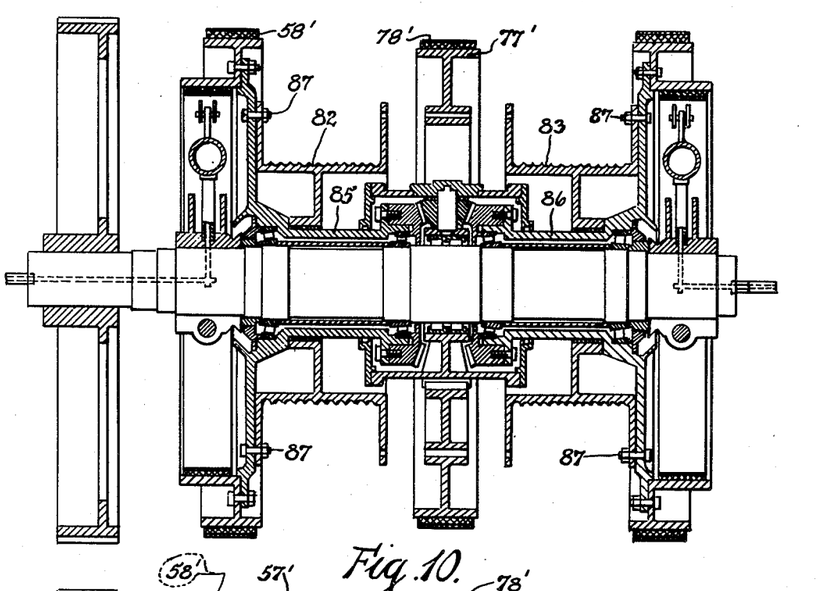
Figure 10 is the same section as Figure 9, showing our third embodiment converted into a regenerative dragline.

Third dragline embodiment (Figure 10)

Turning now to Figure 10, we see that to convert our third embodiment, as above described, into a regenerative dragline, the drum sections 82 and 83 are disconnected from brake drum 77' by taking out bolts 84 (Figure 9), and sprocket 37' (Figure 9) is removed by taking out bolts 71'. The drum sections 82 and 83 are then slid outwardly until they can be connected to the vertical face of sleeves 85 and 86 respectively by bolts 87. The mechanism is then ready to function as a regenerative dragline, the conversion having been accomplished by the removal of only a single part (the sprocket) and the addition of none. To reconvert the machine to a shovel, the reverse procedure is followed with the same simplicity. Note, moreover, that even removal of the sprocket could be obviated by changing its relative size and/or the point of attachment between the drum and sleeve.

OPERATION

First shovel embodiment (Figures 1–3)

In the first shovel embodiment (Figures 1–3) there are five controls, namely: hoist brake 58, hoist clutch 55, thrust brake 50, retract clutch 51, and thrusting-out clutch 35. Inasmuch as each of these five can be either set or released, there are thirty-two combinations.

However these combinations are reduced by the fact that there are certain "interfering" situations and/or "uncontrollable" situations, which may occur, and one useless combination. By "interfering" situations we mean one in which one clutch would act against another clutch or a brake. By "uncontrollable" situation, we mean one in which the dipper would be free to drop with no single control available to stop or control such drop.

The interfering situations all arise out of thrusting, with respect to which there are four alternatives, namely: thrust brake set, thrust-out clutch set, retracting clutch set, and a sort of backhanded thrusting out (hereinbelow described more in detail) which results from the simultaneous setting of hoist clutch and hoist brake. If any two or more of these four functions concur, we have "interference."

We contemplate controlling the thrust and retract clutches by one and the same lever, thus eliminating interference between them. The other interferences could, of course, be eliminated either by adding the thrust brake to the thrust control lever, and by controlling both the hoist clutch and the hoist brake by another single lever; or, better still, by providing an electrical or mechanical interlock (well known per se) whereby the setting of any clutch will automatically ease off the corresponding brake and vice versa. But these other interferences are not likely to occur in practice, due to the fact that shovel operators instinctively omit to apply any clutch and its corresponding brake simultaneously, except for a desirable slight overlap in shifting from one to the other.

Merely setting the hoist clutch and hoist brake simultaneously would not alone create an interference, but rather (strange to say) would cause a very speedy pure thrusting out, which (if not unexpected by the shovel operator) could have many useful uses. Accordingly it might be inadvisable to employ an interlock which would prevent this.

Furthermore, the various interferences, except the last-mentioned one, are not only no more likely to occur than similar interferences in other types of power-shovel, but also would merely stall the engine. As in the case of such interferences in other types of power-shovel, the beginning of stalling should flag the operator to release the guilty control.

The uncontrollable situation (four combinations), which in one combination overlaps an interfering situation, is: hoist clutch and both brakes released. But this also is not serious, for no experienced operator would be any more likely to release his dipper and let it drop with this type of shovel than with any other.

The one useless combination is: only the hoist brake set.

Eliminating from consideration the interfering, uncontrollable, and useless combinations, we have nine useful combinations, as follows:

1. Both brakes set, all clutches released. Dipper held motionless.
2. Only hoist clutch and thrust brake set. Pure hoist.
3. Only thrust brake set, hoist brake partially set. Pure controlled lowering.
4. Only thrusting-out clutch and hoist brake set. Pure non-rope-thrust thrusting out.
5. Only hoist clutch and hoist brake set. Very speedy pure non-rope-thrust thrusting out—about four times as fast as No. 4, and about twice as fast in the opposite direction as No. 6.
6. Only retracting clutch and hoist brake set. Pure non-rope-thrust retracting—about twice as fast in the opposite direction as No. 4.
7. Only hoisting and retracting clutches set. Hoist high speed, plus retract. This is the equivalent of rope-thrust hoisting, plus retracting, plus the additional hoisting which is incident to the retracting.
8. Only hoisting and thrusting-out clutches set. Hoist slow speed, plus thrusting-out. This is the equivalent of definite path digging with a positive-thrust machine, except that in our invention we have the speed divided between the two motions.
9. Only the hoisting clutch set. Hoisting, plus rope-thrust thrusting-out, the latter being limited merely by the resistance of the bank. If this resistance proves insufficient to prevent too deep a bite, the line of cut can be controlled, as in a rope-thrust shovel, by a partial setting of the thrust brake, thus verging into combination 2. If, however, the resistance of the bank proves too much, thus preventing as deep a bite as is desired, this resistance can be countered by a partial setting of the thrusting-out clutch, thus verging into combination 8.

Thus our invention gives us: hold; pure hoist; controlled lowering; two speeds of pure non-rope-thrust thrusting out; pure non-rope-thrust retracting; non-rope-thrust slow speed combined thrust and hoist; rope-thrust combined thrust and hoist; and rope-thrust high-speed combined retract and hoist.

Furthermore, a careful choice of gear and sprocket ratios can give us any desired direction of digging during the non-rope-thrust combined hoisting and crowding, and the use of a conical drum can give us any desired change of hoist speed at different heights of hoist; this last being, however, a well-known expedient which constitutes no part of our invention.

It should be noted that, considering the hoist drum, the three clutches and the two brakes, apart from any connection with thrusting, it is possible to secure selectively: three hoist speeds, no motion at all, and controlled lowering, as follows:

1. Hoist clutch and retracting clutch set. High speed hoist.
2. Hoist clutch and thrust brake set. Medium speed hoist.
3. Hoist clutch and crowd-out clutch set. Low speed hoist.
4. Hoist brake set. No motion.
5. Hoist brake eased off. Controlled lowering.

*First dragline embodiment (Figure 4)*

In our first embodiment converted to a conventional dragline (Figure 4), there are four controls, namely hoist brake 58, hoist clutch 55, drag brake 50, and drag clutch 51. Since each of these four controls can be either set or released, there are sixteen combinations, of which, however, seven are "interfering" situations which can be eliminated by controlling the hoist clutch and hoist brake by a single lever and the drag clutch and drag brake by another single lever (these being the same common levers as were employed to control the same clutches and brakes for hoisting and for thrusting in our shovel above described), or by providing conventional electrical or mechanical interlocks whereby setting of any clutch will automatically ease off the corresponding brake and vice versa. The remaining nine combinations then are:

1. Both brakes set, both clutches released. Bucket held motionless.
2. Only hoist clutch and drag brake set. Pure hoist.
3. Only drag clutch and hoist brake set. Pure drag.
4. Both clutches set. Combined hoist and drag.
5. Only hoist brake set. Pure drag release.
6. Only drag brake set. Pure hoist release.
7. Only hoist clutch set. Combined drag release and hoist.
8. Only drag clutch set. Combined hoist release and drag.
9. Both brakes and clutches released. Combined hoist release and drag release.

*Second shovel embodiment (Figures 6 and 8)*

Figure 8:
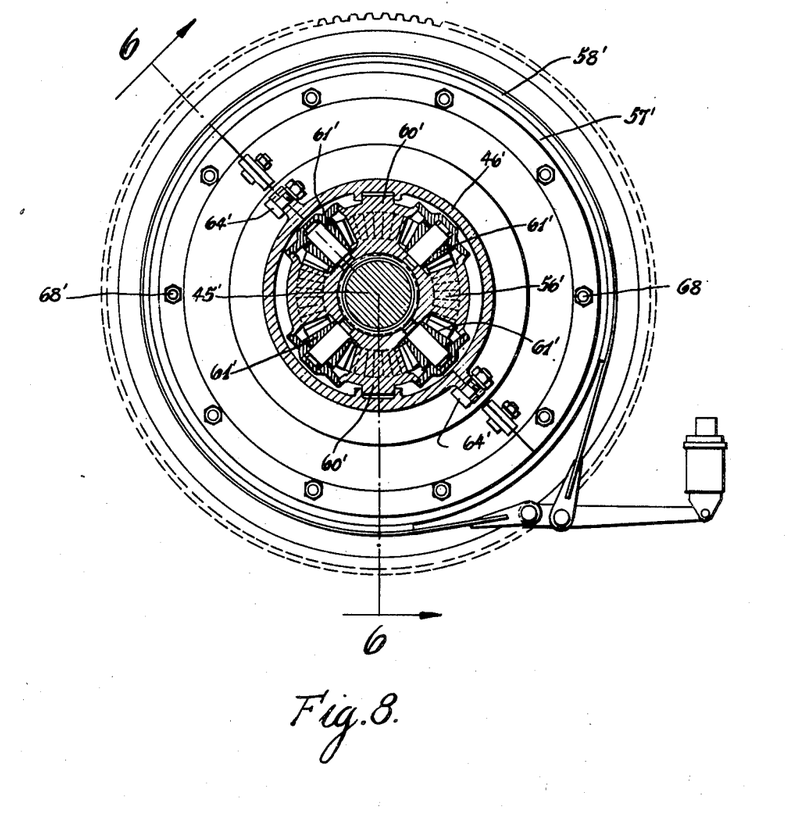
Figure 8 is a section, taken along the lines 8—8 of Figure 6.

This embodiment operates in the same manner as our first shovel embodiment, similar considerations governing the selection of appropriate controls, except that in useful combination No. 5 (only hoist brake and hoist clutch set) the pure thrusting-out speed is equal to and in the opposite direction to the pure retracting of No. 6 and is only about twice instead of four times as fast as the slower thrusting-out of No. 4.

*Second dragline embodiment (Figure 7)*

Our second shovel embodiment, when converted into a conventional dragline (Figure 7), operates in the same manner as our first dragline embodiment.

Third shovel embodiment (Figure 9)

This embodiment operates in the same manner as our second shovel embodiment, similar considerations governing the selection of appropriate controls, except that brake 78' is substituted for brake 58' as the hoist brake and that brake 58', whose drum 57' is now bolted to sleeve 85, either can be used to obtain a hoist (or lowering) combined with retract (or thrusting-out) or can simply be not used when the machine is operating as a shovel.

Third dragline embodiment (Figure 10)

Our third embodiment, when converted into a dragline (Figure 10), operates in the same manner as our first dragline embodiment, except that we now have a fifth control, namely, the regenerative brake 78'. Therefore there are thirty-two, instead of sixteen, possible combinations, of which seventeen involve useless interferences, nine involve the above-described useful combinations of a conventional dragline, and six involve regeneration either pure or in combination with braking.

The seventeen useless interference combinations arise when one or more of the following occur:

1. Hoist brake and clutch both set.
2. Drag brake and clutch both set.
3. Regenerative brake and both clutches set.
4. Regenerative brake, hoist (or drag) brake, and drag (or hoist) clutch set.

Interference in the first two classes of case are prevented by use of common brake-clutch controls for hoist and drag. Interference in the third and fourth cases can be prevented by use of mechanical or electrical interlocks, but such interlocks are not essential, for these cases occur only where three controls are set at the same time, whereas all of the useful combinations occur when only two controls are used.

The nine useful combinations of conventional dragline operation arise when the regenerative brake control is in released position and the other controls are set as indicated in the description of the operation of our first dragline embodiment. The six cases involving regeneration all occur when the regenerative brake is set and the hoist and drag controls are applied as follows:

1. Hoist clutch only set. Drag drum pays out.
2. Drag clutch only set. Hoist drum pays out.
3. Hoist brake applied for controlled pay-out of hoist drum. Drag drum pays in.
4. Drag brake applied for controlled pay-out of drag drum. Hoist drum pays in.
5. Hoist and drag controls released. Hoist and drag line pulls balanced. Direction of motion depends on relative tension in lines. Usually an undesirable combination because uncontrolled.
6. Hoist and drag brakes set. Same as normal hold for conventional dragline. No regeneration involved unless slipping occurs. This case is useful in that it provides more braking power than when two brakes are used, a desirable feature in deep digging.

Having now described and illustrated three forms of our invention, we wish it to be understood that our invention is not to be limited to the specific forms or arrangement of parts herein described and shown.

In the claims whenever we refer to "one sleeve" and later in the same claim again refer to "one sleeve," the second or third-mentioned "one sleeve" may be a different one of the two sleeves from any "one sleeve" previously referred to in the same claim. Also, in the claims when we refer to planetary gearing, it is to be understood that we intend either spur- or bevel-gear type gearing unless we specify a particular type.

We claim:

1. In a power-excavator, the combination of: a rotary power source; planetary gearing comprising planet gears, a rotating spider on which the planet gears are journaled, and, two non-planet gears, namely a sun gear and an internal ring gear, each engaging the planet gears; a hoist drum constrained to rotate with the spider; rotary thrusting means; means for clutching one of the non-planet gears to the power source; means for braking the drum; means for clutching the other non-planet gear to the power source; means for braking said gear; means drivingly connecting said gear and the rotary thrusting means to each other; and means for clutching the rotary thrusting means to the power source for reverse rotation.

2. A power-excavator according to claim 1, characterized by the fact that the said one of the non-planet gears is an internal ring gear, and that the said other non-planet gear is a sun gear.

3. A power-excavator according to claim 1, characterized by the fact that there is a driving connection between the thrusting means and said other non-planet gear, and that the gear ratios are such that, when the said one of the non-planet gears is clutched to the power source, and the said other non-planet gear is clutched to the power source by the said means for clutching the rotary thrusting means, the rotational effect imposed on the drum by the said one of the non-planet gears will exceed the reverse rotational effect imposed on the drum by the said other non-planet gear.

4. In a power-excavator, the combination of: a rotary power source; planetary gearing comprising planet gears, a rotating spider on which said planet gears are journaled, and two non-planet gears, each engaging said planet gears; a hoist drum constrained to rotate with the spider; rotary thrusting means; means for clutching one of the non-planet gears to the power source; means for braking the drum; means for clutching the other non-planet gear to the power source; means for braking said gear; means drivingly connecting said gear and the rotary thrusting means to each other; and means for clutching the rotary thrusting means to the power source for reverse rotation.

5. A power-excavator according to claim 4, characterized by the fact that the said one of the non-planet gears is an internal ring gear, and that the said other non-planet gear is a sun gear.

6. In a winch the combination of: a rotary power shaft; a winch drum, free to rotate on the shaft, and split lengthwise for easy removal therefrom; shafts journaled eccentrically on the drum at the line of split thereof for easy removal therefrom; planet gears mounted on said last-mentioned shafts; two non-planet gears, each engaging the planet gears; means for clutching one of the non-planet gears to the power source; means for braking the winch drum; means for clutching the other non-planet gear to the power source; and means for braking said gear.

7. In a power-excavator, the combination of: a rotary power source; differential gearing comprising planet pinion gears, a rotating spider on which said pinion gears are journaled, and two non-planet bevel gears, each engaging said pinion gears; a hoist drum constrained to rotate with the spider; rotary thrusting means; means for clutching one of the bevel gears to the power source; means for braking the drums; means for clutching the other bevel gear to the power source; means for braking said gear; means drivingly connecting said gear and the rotary thrusting means to each other; and means for clutching the rotary thrusting means to the power source for reverse rotation.

8. In a mounting for alternative use of the hoist-drum of a power shovel and the two drums of a dragline excavator, the combination of: a constantly rotating power shaft; two flanged sleeves free to rotate thereon; a clutch drum carried by the flange of one sleeve; a clutch drum and a brake drum carried by the flange of the other sleeve; a brake drum removably connected to the said one sleeve, and adapted to be removed therefrom and be connected instead to a shovel hoist drum; a non-planet gear carried by one sleeve; means on the other sleeve for attachment to a second non-planet gear; means on one sleeve for attachment to a sprocket; means on both sleeves to rotatably support a shovel hoist drum; means on each sleeve for attachment of a dragline drum; a fixed brake band for each of the two brake drums; and a clutch rotating with the shaft for each of the two clutch drums.

9. In a mounting for alternative use of the hoist-drum of a power shovel and the two drums of a dragline excavator, the combination of: a constantly rotating power shaft; two sleeves free to rotate thereon; a clutch element carried by one sleeve; a clutch element and a brake element carried by the other sleeve; a brake element removably connected to the said one sleeve and adapted to be removed therefrom and be connected instead to a shovel hoist drum; a non-planet gear carried by one sleeve; means on the other sleeve for attachment to a second non-planet gear; means on one sleeve for attachment to a sprocket; means on each sleeve to rotatably support a shovel hoist drum; means on each sleeve for attachment of a dragline drum; a fixed cooperating brake element to engage each brake element; and a cooperating clutch element rotating with the shaft to engage each of the two clutch elements.

10. In a power-excavator, the combination of: a rotary power source; planet gears; a rotating spider on which the planet gears are journaled; two non-planet gears each engaging the planet gears; a hoist drum constrained to rotate with the spider; means for clutching one of the non-planet gears to the power source; means for braking the drum; means for clutching the other non-planet gear to the power source; means for braking said gear; and means for clutching said gear to the power source for reverse rotation.

11. In a winch for a dragline excavator convertible into a shovel excavator, the combination of: a rotary power-source; planet gears; a rotatable spider on which the planet gears are journaled; two non-planet gears, each engaging the planet gears; means to clutch the first of these non-planet gears to the power-source; means for braking said first non-planet gear; means to clutch the second non-planet gear to the power-source; means for braking said second non-planet gear; two drums, each operatively connected to one of the two non-planet gears, one of these drums being disconnectable from the first non-planet gear; and means for operatively connecting a drum to the spider, when the disconnectable drum has been disconnected from the first non-planet gear.

12. A winch according to claim 11, further characterized by the fact that one element of the brake means for the first non-planet gear is disconnectable therefrom; and that there is means for connecting this element to the spider when so disconnected from the first non-planet gear.

13. A winch according to claim 12, further characterized by the fact that the drum which is operatively connected to the second non-planet gear, is disconnectable therefrom, and that there is means for operatively connecting a sprocket to said second non-planet gear, when said last-mentioned drum has been disconnected therefrom.

14. A winch according to claim 11, further characterized by the fact that there is means for braking the spider.

15. A winch according to claim 14, further characterized by the fact that the means for operatively connecting a drum to the spider, when the disconnectable drum has been disconnected from the first non-planet gear, is means for thus connecting the thus disconnected drum.

16. A winch according to claim 15, further characterized by the fact that the second drum is disconnectable from the second non-planet gear, and that there is means for operatively connecting this drum too to the spider, when this drum has been disconnected from the second non-planet gear.

17. A winch according to claim 16, further characterized by the fact that there is means for operatively connecting a sprocket to the second non-planet gear, when the drum has been disconnected therefrom.

18. A winch according to claim 11, further characterized by the fact that the two drums, when disconnected from their respective non-planet gears, are slidable toward the spider for connection thereto.

19. A winch according to claim 11, further characterized by the fact that the rotary power-source is a shaft; that there are two sleeves, each free to rotate about the shaft; that the two non-planet gears and the spider are mounted for free rotation about this shaft, each such gear being secured to and constrained to rotate with one of the sleeves; that the driven element of each clutch is secured to and constrained to rotate with one of the sleeves; and that each drum is secured to and constrained to rotate with one of the sleeves.

TREVOR O. DAVIDSON.
BRUNO L. LONNGREN.

REFERENCES CITED

The following references are of record in the file of this patent:

UNITED STATES PATENTS

| Number | Name | Date |
|---|---|---|
| 624,810 | Hunt | May 9, 1899 |
| 1,899,901 | Nickliss | Feb. 28, 1933 |